United States Patent Office 3,353,959
Patented Nov. 21, 1967

3,353,959
FLAVORINGS CONTAINING CYCLOHEXANESULFAMIC ACID AND CYCLAMATE SALTS FOR CASEIN-CONTAINING PRODUCTS
William D. Rutz, Tulsa, Okla., assignor to Donald F. Gregg, Sibley, Iowa
No Drawing. Filed Dec. 14, 1964, Ser. No. 418,346
11 Claims. (Cl. 99—28)

The present invention relates to the preparation of artificially sweetened, dry food products and more particularly to instant-type, water dispersible, nonfat dry milk and related dry beverage mixes.

The acceptance of artificially sweetened food products and weight reduction diet preparations is well established. Some of these food products are sugarless liquid beverages in which combinations of saccharin and cyclamate salts, or other ingredients are employed as sweetening agents. These products contain only a few calories per serving, but they do not provide many of the food nutrients required in a normal or weight reduction diet. In addition, many other types of low fat and/or sugar-containing food products have been marketed which contain a specific number of calories in each serving or portion.

Nonfat dry milk has also been used in both normal and special diets, because it is an economical source of protein, minerals and vitamins, and because it is essentially a complete diet. However, many people do not like the flavor of reconstituted nonfat dry milk, especially when used as a beverage. Consequently, acceptance is greatly improved by flavoring the product.

This invention relates to the preparation of dry, artificially sweetened, flavored nonfat dry milk, possessing superior qualities to those generally known in the art.

One of the problems encountered in preparing flavored, dry products of this type is relatively poor flavor and palatability. This is especially true in those acid-containing fruit-flavored products, in which the natural flavor of the fruit is a composite of flavor contributing substances, including acids. Fruit flavored dairy products, such as sherbets, contain one or more organic acids which are necessary impart tartness and flavor. Omitting these acid ingreidents results in loss of palatability.

Similarly dry dairy-type beverages, such as nonfat dry milk, which contain natural or imitation fruit flavors, need to contain one or more acidulants for optimum flavor. Some acids commonly used as acidulants in dry food products include adipic, citric, fumaric, malic and tartaric acids. When these acids are mixed into a dry milk product at levels sufficiently great enough to increase the acidity of the reconstituted product to organoleptically recognizable and beneficial levels, precipitation of some casein invariably occurs. This is apparent by the appearance of a soft, flocculent casein material, some of which is instantly carried to the surface of the container by air incorporated during stirring. This defect is highly objectionable from an esthetic standpoint, since curdy material is often associated with sour milk or spoilage defects.

While it is possible to add acids to sherbet and like mixes during manufacture in dilute aqueous form, or otherwise homogenize, blend or pump, or add various ingredients to resuspend precipitated milk proteins in this and some other food preparations to which acids are added, a dry instant-type beverage should exhibit no visible precipitation when water is added to the product by the consumer.

As will hereinafter more fully appear in connection with the description of the present invention, it has been discovered that cyclohexanesulfamic acid may be used as a component of a powdered, dry flavor mixture for use in flavoring dairy products such as nonfat dry milk whereby in the cyclohexanesulfamic acid possesses all of the desired attributes of an acidulant to impart flavor and palatability to the ultimate product while, at the same time, having the added advantage of avoiding or preventing precipitation when water is added to the product by the consumer. This acidulant does not have the property which is common with so many other acidulants directly causing precipitation of the casein from the solution.

A principal object of the present invention is to provide a powdered flavor mixture containing cyclohexanesulfamic acid for use as a flavoring additive for food ingredients containing casein.

Another object of the present invention is to provide a mixture of powered flavoring materials containing cyclohexanesulfamic acid and food ingredients containing casein, to which mixture tepid or cold water may be added with no deleterious effects.

Still another object is to provide an intimate mixture of cyclohexane-sulfamic acid in such proportions with ingredients containing casein, flavoring and other food material, that palatability and flavor are enhanced, and precipitation reduced or eliminated, as compared with similar combinations containing other acidulants.

These and other objects will be apparent from the following detailed examples which serve to illustrate the invention.

EXAMPLE I

*Lime flavored beverage (flavored nonfat dry milk)*

|  | Grams |
|---|---|
| Nonfat dry milk | 90.7 |
| Cyclohexanesulfamic acid | 0.75 |
| Calcium cyclamate | 0.315 |
| Sodium saccharin | 0.035 |
| Lime flavor and color | 0.20 |

After blending the dry ingredients in Example I for about 10 minutes in a laboratory mixer, the product was added to one quart of cold water at 35 degrees F., and dissolved or suspended by stirring for several seconds. The product rapidly dissolved with no visible or objectionable precipitation of casein. When other dry food acids are used in similar formulations at the same usage rates, or at levels comparable to effect the same degree of acidity and/or flavor enhancement, some objectionable precipitation immediately occurs. Various acids including adipic, citric, fumaric, malic and tartaric are unsatisfactory acidulants in the formulation listed in Example I, even when used in quantities as low as 0.25 gram. It should be noted that cyclohexanesulfamic is a relatively strong acid. Furthermore, the poor water solubility of some of these commonly-used acids precludes their use in cold water soluble or dispersible preparations.

Thus, it is possible to prepare some dry dairy-food products to which water must later be added, employing cyclohexanesulfamic acid as an acidulant or flavor enhancer. This is especially applicable to those dry food products which consist in part of casein-containing ingredients, such as nonfat dry milk, dry whole milk or soluble caseinate salts.

EXAMPLE II

*Lemon flavored beverage (flavored nonfat dry milk)*

|  | Grams |
|---|---|
| Nonfat dry milk | 90.7 |
| Cyclohexanesulfamic acid | 0.75 |
| Calcium cyclamate | 0.675 |
| Sodium saccharin | 0.075 |
| Lemon flavor and color | 0.20 |

Example II illustrates a lemon flavored bevereage in which the same amount of cyclohexanesulfamic acid may be used as that illustrated in Example I. Example III reveals a formulation in which a lesser amount of cyclohexanesulfamic acid was effective.

EXAMPLE III

*Cherry flavored beverage (flavored nonfat dry milk)*

|  | Grams |
|---|---|
| Nonfat dry milk | 90.7 |
| Cyclohexanesulfamic acid | 0.40 |
| Calcium cyclamate | 0.54 |
| Sodium saccharin | 0.06 |
| Cherry flavor and color | 0.08 |

The pH of the illustrated formulations ranges from 6.3 to 6.4 which is the preferred range. However, other formulations may range from about 6.2 to 6.6, depending upon the ingredients used and especially the amounts of cyclohexanesulfamic acid.

The use of cyclohexanesulfamic acid with other ingredients described results in an enhancing tart, characteristic fruit flavor. Without any acidulant the flavor characteristics are bland and atypical of fruit. Since nonfat dry milk, and specifically milk serum fractions in general, act as strong buffers, much greater changes in pH are not feasible or desirable, because of the excessive acid flavor imparted and because of protein precipitation.

The amount of cyclohexanesulfamic acid which may be used depends upon the type and character of flavor desired. Normally, citrus flavors such as lime or lemon require more acid for optimum flavor than non-citrus flavors. When higher levels of cyclohexanesulfamic acid are used in the formulations described, such as 1.0 to 1.25% on a dry weight basis, precipitation of protein may occur, especially if the temperature of the water used to reconstitute, is warm or hot. However, if cold water at 35 degrees F. is used to reconstitute the flavored nonfat dry milk product, as much as 1.25% cyclohexanesulfamic acid has been successfully employed with no objectionable precipitation. The preferred usage, however, is not more than about 0.75% on a dry weight basis, since under these conditions, the product may be reconstituted with cold water or water at room temperature with no objectionable protein precipitation.

With particular regard to Example I illustrated above, tests in the laboratory have shown that the amount of cyclohexanesulfamic acid can vary from 0.30 to 1.25 grams while holding the other ingredients at the amounts specified; at the lower levels of cyclohexanesulfamic acid the lime flavor is not brought out or accentuated to the optimum although it is noticeable and certainly considerably improved over a mixture containing no cyclohexanesulfamic acid. At higher concentrations of cyclohexanesulfamic acid (and preferably below those concentrations at which incipient precipitation occurs) there is no noticeable improvement in flavor over the optimum amount of 0.75; hence, with regard to Example I, any amount of cyclohexanesulfamic acid above 0.75 gram would be an unnecessary excess. The same considerations as set forth above hold for Example II. With regard to Example III, the preferred or optimum amount of cyclohexanesulfamic acid is indicated as 0.40 for the simple reason that the tartness required or desired for a cherry flavored beverage is less than that for a lemon flavored beverage or a lime flavored beverage; however, the cyclohexanesulfamic acid in Example III could be varied from 0.20 to 0.80 gram as desired.

EXAMPLE IV

*Lime flavored beverage (flavored nonfat dry milk)*

|  | Grams |
|---|---|
| Nonfat dry milk | 90.7 |
| Cyclohexanesulfamic acid | 0.75 |
| Calcium cyclamate | 0.75 |
| Lime flavor and color | 0.20 |

EXAMPLE V

*Lime flavored beverage (flavored nonfat dry milk)*

|  | Grams |
|---|---|
| Nonfat dry milk | 90.7 |
| Cyclohexanesulfamic acid | 0.75 |
| Sodium saccharin | 0.07 |
| Lime flavor and color | 0.20 |

The formulations in Examples IV and V contain a minimum number of ingredients, but include basic ingredients which result in improved product characteristics. These basic ingredients include a sweetening agent such as the cyclamate salt used in Example IV or a saccharin salt as indicated in Example V, or a combination of these salts together with cyclohexanesulfamic acid which is used to impart acidic flavor characteristics, and proper color and flavor substances. The cyclamate salts and saccharin salts (used separately or in combination) are employed principally to provide sweetness. Naturally, the amounts of each can be varied proportionately above and below those indicated in the examples if a lesser or greater sweetness effect is desired. Also, sodium cyclamate can be used in place of calcium cyclamate in equal amounts, although calcium salts are oftentimes preferred for specific dietary reasons. Furthermore sodium saccharin can be replaced by calcium saccharin in equal amounts if desired. Thus, with the amounts of the other ingredients remaining constant in Example I, the amount of calcium (or sodium) cyclamate can vary from about 0.10 to 0.80 while the amount of sodium (or calcium) saccharin simultaneously varies from about 0.01 to 0.08. With regard to Example II, the sweeting agents are present in amounts close to their upper limits but, of course, can be reduced accordingly as indicated above with regard to Example I. Example III can be considered, as far as the sweetening agents are concerned, to be subject to the same variations as set forth above with regard to Example I.

With particular regard to Example IV the cyclamate salt (sweetener) can vary from 0.20 to 1.25 grams. With regard to Example V, the saccharin can vary from 0.02 to 0.15 gram.

In all of the examples illustrated, the flavoring material (lemon, lime, cherry) may vary greatly depending upon the flavoring strength or concentration. However, with respect to most flavoring agents which are commercially available, the amounts indicated in the specific examples would most likely produce the optimum flavor required or desired.

While the examples shown herein include the basic ingredients together with nonfat dry milk, it is apparent that the basic ingredients (without the nonfat dry milk) could be blended separately and then added to either nonfat dry milk or other related dry beverage products, or to fluid skim milk or whole milk.

The variations in the amounts of cyclohexanesulfamic acid employed in Examples IV and V have been shown to be the same, under laboratory tests, as those previously described with regard to Examples I and II.

In the products illustrated, instantized nonfat dry milk was simply blended with other dry ingredients. However, regular spray-dried nonfat dry milk and other dry ingredients may be mixed, and then the entire contents agglomerated or instantized with equipment commonly used for this purpose.

Preparation of the product may include combinations of cyclohexanesulfamic acid with small quantities of other acidulants, or some of the nonfat dry milk may be replaced with other dry products such as soluble caseinates, dried buttermilk, dried whey or dried whole milk. In addition sweetness may be imparted by various sweetening agents or combination thereof.

In the event that sodium cyclamate is used as a major sweetening ingredient instead of calcium cyclamate, it is recognized by those familiar with the chemistry of dairy products that it is possible to use greater amounts of acids, such as cyclohexanesulfamic acid, because calcium ions or salts adversely affect protein precipitation in milk systems to a greater degree than sodium ions or salts.

The use of cyclohexanesulfamic acid is not limited to fruit flavored products only, but has also been used successfully to enhance vanilla flavored nonfat dry milk.

It is intended that all matter contained in the examples cited shall be interpreted as illustrative and not in a limiting sense. Thus many variations of the composition and amount of cyclohexanesulfamic acid and other ingredients may be used which will be apparent to those skilled in the art without departing from the spirit of the invention, and references should be made to the appended claims for a definition of the limits of the invention.

What is claimed is:

1. A flavoring additive for a food product containing casein comprising a dry powdered water soluble mixture containing cyclohexanesulfamic acid, a physiologically acceptable cyclamate salt and a flavor.

2. A flavoring additive for a liquid dairy-type beverage containing casein comprising 0.20 to 1.25 grams of cyclohexanesulfamic acid, 0.10 to 1.25 grams of a physiologically acceptable cyclamate salt and about 0.20 gram of flavor, the above amounts of flavoring additive being sufficient to flavor about one quart of said liquid dairy-type beverage.

3. A powdered flavor mixture comprising about 90.7 grams of nonfat dry milk, 0.75 gram of cyclohexanesulfamic acid, 0.315 gram of calcium cyclamate, 0.035 gram of sodium saccharin, and 0.20 gram of lime flavor and color, the above ingredients being added to about one quart of water to produce about one quart of lime flavored beverage.

4. A powdered flavor mixture comprising about 90.7 grams of nonfat dry milk, 0.75 gram of cyclohexanesulfamic acid, 0.675 gram of calcium cyclamate, 0.075 gram of sodium saccharin, and 0.20 gram of lemon flavor and color, the above ingredients being added to about one quart of water to produce about one quart of lemon flavored beverage.

5. A powdered flavor mixture comprising about 90.7 grams of nonfat dry milk, 0.40 gram of cyclohexanesulfamic acid, 0.54 gram of calcium cyclamate, 0.06 gram of sodium saccharin, and 0.08 gram of cherry flavor and color, the above ingredients being added to about one quart of water to produce about one quart of cherry flavored beverage.

6. A powdered flavor mixture comprising about 90.7 grams of nonfat dry milk, 0.75 gram of cyclohexanesulfamic acid, 0.75 gram of calcium cyclamate, 0.20 gram of lime flavor and color, the above ingredients being added to about one quart of water to produce about one quart of lime flavored beverage.

7. A powdered flavor mixture for a liquid dairy-type and casein-containing product comprising about 0.75 gram of cyclohexanesulfamic acid, 0.315 gram of calcium cyclamate, 0.035 gram of sodium saccharin, and 0.20 gram of lime flavor and color, the above ingredients being added to about one quart of product to produce about one quart of lime flavored beverage.

8. A powdered flavor mixture for a liquid dairy-type and casein-containing product comprising about 0.75 gram of cyclohexanesulfamic acid, 0.675 gram of calcium cyclamate, 0.075 gram of sodium saccharin, and 0.20 gram of lemon flavor and color, the above ingredients being added to about one quart of product to produce about one quart of lemon flavored beverage.

9. A powdered flavor mixture for a liquid dairy-type and casein-containing product comprising about 0.40 gram of cyclohexanesulfamic acid, 0.54 gram of calcium cyclamate, 0.06 gram of sodium saccharin, and 0.08 gram of cherry flavor and color, the above ingredients being added to about one quart of product to produce about one quart of cherry flavored beverage.

10. A powdered flavor mixture for a liquid dairy-type and casein-containing product comprising about 0.75 gram of cyclohexanesulfamic acid, 0.75 gram of calcium cyclamate, 0.20 gram of lime flavor and color, the above ingredients being added to about one quart of product to produce about one quart of lime flavored beverage.

11. A powdered flavor mixture comprising about 90.7 grams of nonfat dry milk, 0.20 to 1.25 grams of cyclohexanesulfamic acid, 0.10 to 1.25 grams of a physiologically acceptable cyclamate salt and about 0.08 to 0.20 gram of a flavor, the above ingredients being added to about one quart of water to produce about one quart of flavored beverage.

References Cited

UNITED STATES PATENTS

| | | | |
|---|---|---|---|
| 2,876,104 | 3/1959 | Bliudzius et al. | 99—141 |
| 2,971,848 | 2/1961 | Polya | 99—141 |

A. LOUIS MONACELL, *Primary Examiner.*

H. H. KLARE, *Assistant Examiner.*